US012746916B2

(12) United States Patent
Wadivkar et al.

(10) Patent No.: US 12,746,916 B2
(45) Date of Patent: Sep. 29, 2026

(54) SYSTEMS, PROGRAM PRODUCTS, AND METHODS FOR CONTROLLING AUTONOMOUS VEHICLES TRAVELING WITHIN ENVIRONMENTS

(71) Applicant: Torc Robotics, Inc., Blacksburg, VA (US)

(72) Inventors: Dushyant Ulhas Wadivkar, Austin, TX (US); Hing Fei Wong, Sewickley, PA (US)

(73) Assignee: TORC Robotics, Inc., Blacksburg, VA (US)

( * ) Notice: Subject to any disclaimer, the term of this patent is extended or adjusted under 35 U.S.C. 154(b) by 141 days.

(21) Appl. No.: 18/788,884

(22) Filed: Jul. 30, 2024

(65) Prior Publication Data

US 2026/0035018 A1 Feb. 5, 2026

(51) Int. Cl.

*B60W 30/095* (2012.01)
*B60W 40/02* (2006.01)
*B60W 40/04* (2006.01)
*B60W 60/00* (2020.01)

(52) U.S. Cl.

CPC ........ *B60W 30/0956* (2013.01); *B60W 40/02* (2013.01); *B60W 40/04* (2013.01); *B60W 60/0015* (2020.02); *B60W 60/00184* (2020.02); *B60W 2554/20* (2020.02); *B60W 2554/801* (2020.02); *B60W 2554/802* (2020.02)

(58) Field of Classification Search

None
See application file for complete search history.

(56) References Cited

U.S. PATENT DOCUMENTS

| | | | | |
|---|---|---|---|---|
| 9,524,643 | B2 * | 12/2016 | Goerick | G06V 20/58 |
| 10,300,851 | B1 * | 5/2019 | Kim | B60Q 9/008 |
| 11,648,962 | B1 | 5/2023 | Crego | |
| 11,814,080 | B2 | 11/2023 | Sakamoto | |
| 2016/0185388 | A1 * | 6/2016 | Sim | G06V 20/58 701/41 |
| 2021/0300371 | A1 * | 9/2021 | Sindhuja | B60W 60/001 |

* cited by examiner

*Primary Examiner* — David P. Merlino
(74) *Attorney, Agent, or Firm* — Armstrong Teasdale LLP

(57) ABSTRACT

An autonomous vehicle is provided. The autonomous vehicle comprises sensor(s) configured to detect data relating to an environment surrounding the autonomous vehicle and object(s) included within the environment. The autonomous vehicle also includes an autonomy computing system(s) in communication with the sensor(s). The autonomy computing system(s) include a processor(s) in communication with a memory device(s), and the processor(s) is programmed to calculate a drivable space consumption (DSC) ratio for the autonomous vehicle traveling within the environment based on an anticipated spatial occupancy for the autonomous vehicle within the environment and a drivable space within the environment. The processor(s) is also programmed to determine a risk level for the autonomous vehicle based on the determined DSC ratio, and adjust driving characteristics for the autonomous vehicle traveling in the environment in response to the determined risk level for the autonomous vehicle including a high-risk driving condition.

17 Claims, 11 Drawing Sheets

SYSTEMS, PROGRAM PRODUCTS, AND METHODS FOR CONTROLLING AUTONOMOUS VEHICLES TRAVELING WITHIN ENVIRONMENTS

TECHNICAL FIELD

The field of the disclosure relates generally to autonomous vehicles and, more specifically, systems, program products, and methods for controlling autonomous vehicles traveling within an environment.

BACKGROUND OF THE INVENTION

Existing systems for autonomous vehicles typically rely on a variety of sensors to gather data about the surrounding environment and objects within it. These sensors may include cameras, LiDAR, radar, ultrasonic sensors, and other types of sensors capable of detecting and capturing information about the vehicle's surroundings. The data collected by these sensors is then processed by onboard computing systems to make decisions regarding the vehicle's navigation, obstacle avoidance, and overall safety. However, the process of identifying and assessing potential risks for the autonomous vehicle based on the collected sensor data can be complex and may not always provide a comprehensive evaluation of the environment.

In conventional autonomous vehicle systems, avoiding collisions with other vehicles and/or objects on a road is a primary safety concern for autonomous vehicles. As such, autonomous vehicles typically operate with a "time to collision" operational rule. The time to collision operational rule ensures that the autonomous vehicle operates under driving parameters (e.g., velocity, speed, spacing, etc.) to give autonomous vehicle a predetermined amount of time to stop before colliding into a vehicle or object positioned in front of the autonomous vehicle. However, the time to collision operational rule only considers objects directly in front of the autonomous vehicle. For example, the time to collision operational rule may only consider vehicles and/or objects traveling in the same lane as the autonomous vehicle during operation. As such, and where the autonomous vehicle is traveling in a multi-lane roadway, adjacent lanes and/or adjacent vehicles/objects are typically not considered when controlling the operation of the autonomous vehicle.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, the disclosed provides an autonomous vehicle. The autonomous vehicle comprises one or more sensors configured to detect data relating to an environment surrounding the autonomous vehicle and at least one object included within the environment. The autonomous vehicle also includes at least one autonomy computing system in communication with the one or more sensors. The at least one autonomy computing system comprises at least one processor in communication with at least one memory device, and the at least one processor is programmed to calculate a drivable space consumption (DSC) ratio for the autonomous vehicle traveling within the environment based on an anticipated spatial occupancy for the autonomous vehicle within the environment and a drivable space within the environment. The at least one processor is also programmed to determine a risk level for the autonomous vehicle based on the continuously determined DSC ratio and adjust driving characteristics for the autonomous vehicle traveling in the environment in response to the determined risk level for the autonomous vehicle including a high-risk driving condition.

In another aspect, the disclosed provides one or more non-transitory computer-readable storage mediums for controlling an autonomous vehicle traveling within an environment. The one or more non-transitory computer-readable storage mediums comprises a plurality of instructions stored thereon that, in response to being executed, cause a system to: calculate a drivable space consumption (DSC) ratio for the autonomous vehicle traveling within the environment based on an anticipated spatial occupancy for the autonomous vehicle within the environment and a drivable space within the environment; determine a risk level for the autonomous vehicle based on the continuously determined DSC ratio; and adjust driving characteristics for the autonomous vehicle traveling in the environment in response to the determined risk level for the autonomous vehicle including a high-risk driving condition.

In yet another aspect, the disclosed provides a computer-implemented method for controlling an autonomous vehicle traveling within an environment. The method comprises calculating a drivable space consumption (DSC) ratio for the autonomous vehicle traveling within the environment based on an anticipated spatial occupancy for the autonomous vehicle within the environment and a drivable space within the environment and determining a risk level for the autonomous vehicle based on the continuously determined DSC ratio. The method also comprises adjusting driving characteristics for the autonomous vehicle traveling in the environment in response to the determined risk level for the autonomous vehicle including a high-risk driving condition.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
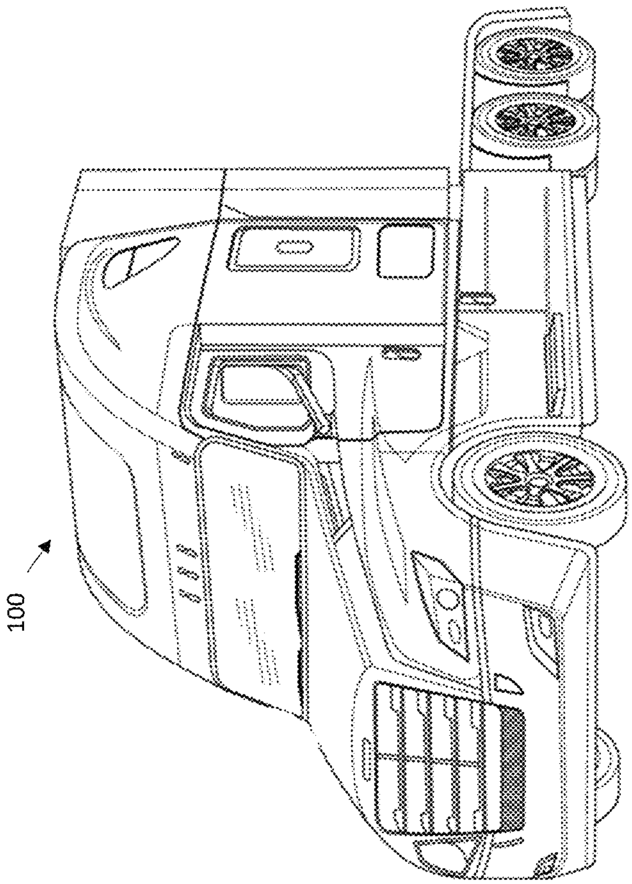
FIG. 1 is a schematic diagram of an autonomous vehicle.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing. The drawings are not to scale unless otherwise noted.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

The disclosed systems and methods are described, for clarity, using certain terminology when referring to and describing relevant components within the disclosure. Where possible, common industry terminology is employed in a manner consistent with its accepted meaning. Unless otherwise stated, such terminology should be given a broad interpretation consistent with the context of the present application and the scope of the appended claims.

Autonomous vehicles discussed herein facilitate identifying risk levels for the autonomous vehicle as it travels within an environment. The risk level for the autonomous vehicle can be identified by comparing defined, spatial occupancies for the autonomous vehicle traveling within the environment and identified drivable spaces within the environment for the autonomous vehicle. The spatial occupancies may be defined based on data generated about the environment, as well as real-time driving characteristics for the autonomous vehicle. Additionally, the drivable space can be identified by outlining a predetermined measured area of the environment, in which sensors of the autonomous vehicle can generate data relating to the environment, driver vehicles, and/or objects, and excluding space within the measured area that are spatially occupied by driver vehicles and/or objects. The comparison of the spatial occupancy of the autonomous vehicle and the identified drivable spaces yields a drivable space consumption ratio that identifies whether the autonomous vehicle is in a high-risk driving condition or a low risk driving condition.

Additionally, the identified risk level for the autonomous vehicle can improve the control and/or operation of the autonomous vehicle. For example, where it is determined that the autonomous vehicle is operating in a high-risk driving condition, driving characteristics of the autonomous vehicle can be adjusted, in real-time, to change or alter the risk level for the autonomous vehicle. Furthermore, where the autonomous vehicle utilizes artificial intelligence, machine-learning, and/or configurable algorithms to operate, adjusting future driving characteristics for the autonomous vehicle based on the identified risk-level and all data determining the risk level can reduce and/or prevent the autonomous vehicle from operating in high-risk driving conditions, and thus improve safety and overall operation of the autonomous vehicle.

As discussed herein, the disclosure relates generally to autonomous vehicles and, more specifically, systems, program products, and methods for controlling autonomous vehicles traveling within an environment. These and other examples are discussed below with reference to FIGS. 1-11.

Figure 2:
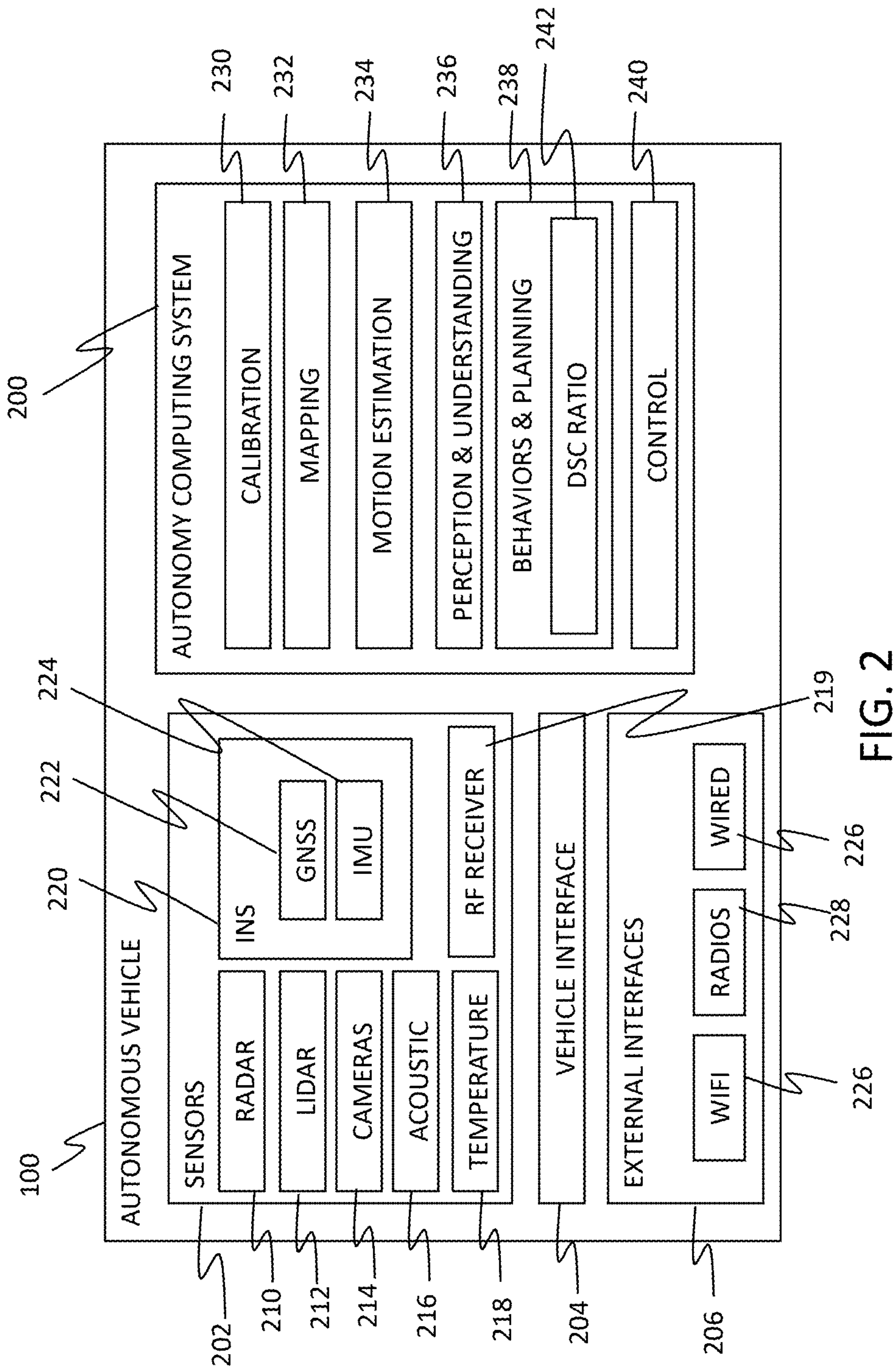
FIG. 2 is a block diagram of an autonomous vehicle.

FIG. 1 is a schematic diagram of an autonomous vehicle 100. FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 120 to determine how to control operation of autonomous vehicle 100.

Cameras 214 are configured to capture images of the environment surrounding autonomous vehicle 100 in any aspect or field of view (FOV). The FOV may have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be stitched or combined to generate a visual representation of the multiple cameras' FOVs, which may be used to, for example, generate a bird's eye view of the environment surrounding autonomous vehicle 100. In some embodiments, the image data generated by cameras 214 may be sent to autonomy computing system 200 or other aspects of autonomous vehicle 100, and this image data may include autonomous vehicle 100 or a generated representation of autonomous vehicle 100. In some embodiments, one or more systems or components of autonomy computing system 200 may overlay labels to the features depicted in the image data, such as on a raster layer or other semantic layer of a high-definition (HD) map.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 may be captured and represented in the LiDAR point clouds. Radar sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw radar sensor data) from the emitted radio waves. In some embodiments, the system inputs from cameras 214, radar sensors 210, or LiDAR sensors 212 may be fused or used in combination to determine conditions (e.g., locations of other objects) around autonomous vehicle 100.

GNSS receiver 222 is positioned on autonomous vehicle 100 and may be configured to determine a location of autonomous vehicle 100, which it may embody as GNSS data, as described herein. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, and or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5*g*, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically or manually) via external interfaces 206 or updated on demand. In some embodiments, autonomous vehicle 100 may deploy with all of the data it needs to complete a mission (e.g., perception, localization, and mission planning) and may not utilize a wireless connection or other connection while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a control module or controller 240, and drivable space consumption (DSC) module 242. DSC module 242, for example, may be embodied within another module, such as behaviors and planning module 238, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

DSC module 242 facilitates determining or identifying a risk level for autonomous vehicle 100 during operation. DSC module 242 receives, for example, data relating to driving characteristics of autonomous vehicle, as well as data relating to object(s) (e.g., driver vehicles, objects) within the environment to determine and/or identify the risk-level. DSC module 242 may also facilitate the adjusting of real-time driving characteristics for autonomous vehicle 100 when it is determined the risk-level for autonomous vehicle 100 includes a high-risk driving condition. Furthermore, DSC module 242 facilitates adjusting future drive characteristics and/or improving the operation of autonomous vehicle 100 by continuously analyzing the data that is provided to DSC module 242 to determine the risk level for autonomous vehicle 100.

Autonomy computing system 200 of autonomous vehicle 100 may be completely autonomous (fully autonomous) or semi-autonomous. In one example, autonomy computing system 200 may operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous.

Figure 3:
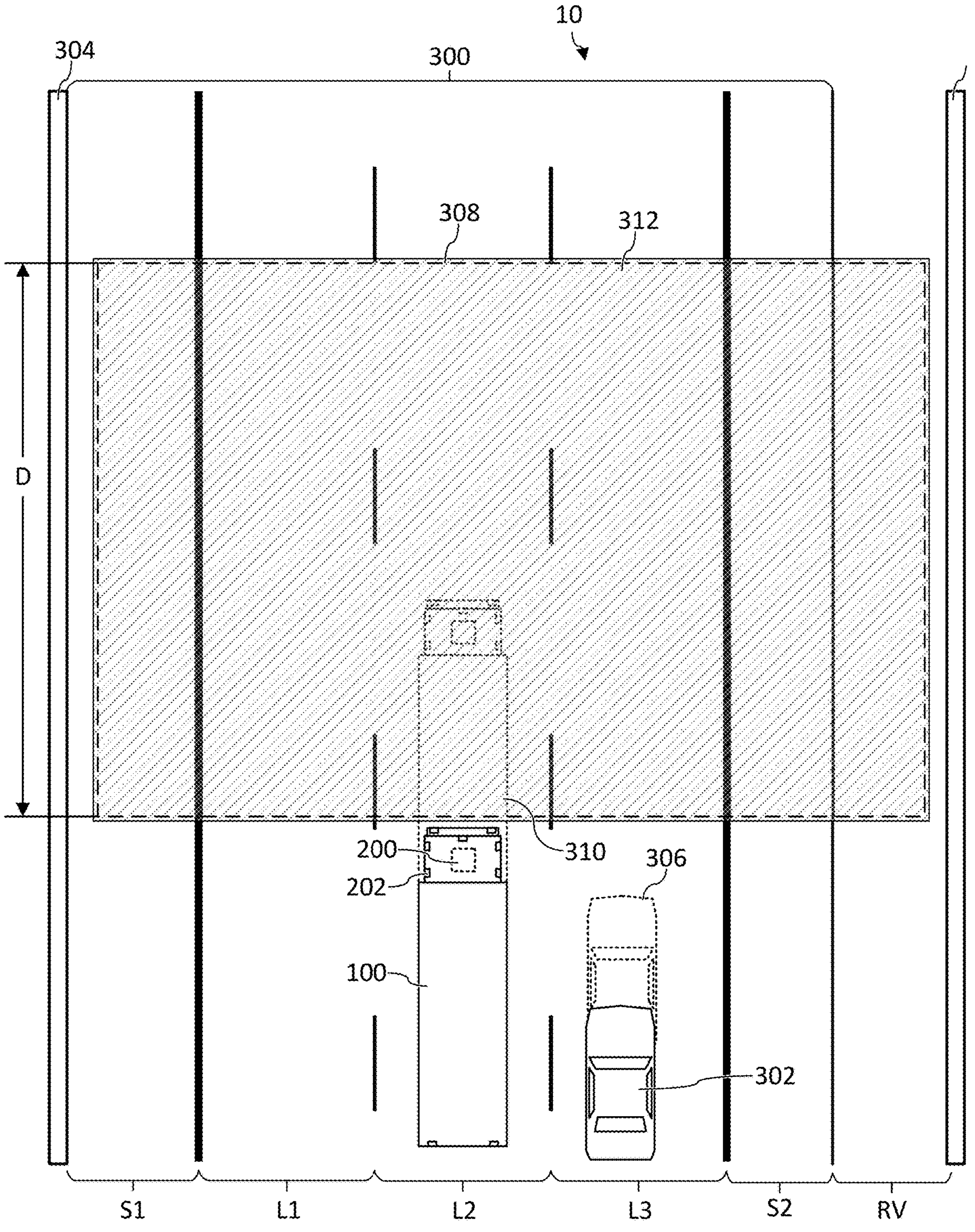
FIG. 3 is an ariel view of an autonomous vehicle and a driver vehicle traveling within an environment including a road and a road verge.

FIG. 3 is an aerial view of a portion of an environment 10 including a road 300, and at least one driver vehicle 302 and autonomous vehicle 100 traveling along road 300. In the example, road 300 includes a first lane (L1), a second lane (L2) formed adjacent first lane (L1), and a third lane (L3) formed adjacent second lane (L2). Additionally in the non-limiting example, road 300 includes a first shoulder (S1) positioned on adjacent first lane (L1) and a second shoulder (S2) positioned adjacent third lane (L3), opposite first shoulder (S1). Environment 10 also includes a road verge (RV) positioned adjacent second shoulder (S2) of road 300. Road verge (RV) may include an unpaved (e.g., grass) area formed adjacent the paved areas (e.g., lanes (L), shoulders(S)) of road 300. Road 300 may be defined and/or flanked by barriers or guard rails 304 positioned adjacent first shoulder (S1) and road verge (RV), respectively. Although three lanes, two shoulders, and one road verge are shown, it is to be understood that environment 10 may include any number of the portions shown and discussed herein.

As shown, driver vehicle 302 is traveling in the third lane (L3) of road 300. In the non-limiting example shown in FIG. 3, driver vehicles 302 is a passenger car or vehicles that is piloted or controlled by a driver. In other non-limiting examples, driver vehicles 302 may include any road-approved vehicle including motorcycles, box-trucks, tractor-trailers, and the like. Additionally, although discussed herein as being controlled by a driver, it is understood that driver vehicles 302 may include an autonomous vehicle as well.

Autonomous vehicle 100 is traveling along road 300 within the second lane (L2), between the first lane (L1) and third lane (L3). Additionally, autonomous vehicle 100 is positioned adjacent to and ahead of driver vehicle 302. In a non-limiting example, autonomous vehicle 100 is an autonomous or self-driving vehicle (e.g., autonomous cargo truck), as similarly discussed herein with respect to FIGS. 1 and 2.

As shown in FIG. 3, autonomous vehicle 100 includes at least one autonomy computing system 200, as discussed herein with respect to FIG. 2. The at least one computing system 200 is electronically coupled and/or communicatively connected to various systems and/or components of autonomous vehicle 100. For example, and as discussed herein, autonomous vehicle 100 includes and/or is in electronic communication with at least one sensor 202. In the non-limiting example, autonomous vehicle 100 includes a plurality of sensors 202 positioned around and/or disposed on various portions of autonomous vehicle 100. As shown in the example in FIG. 3, sensors 202 are disposed on, positioned on, and/or coupled to an exterior of autonomous vehicle 100, adjacent to a front end of autonomous vehicle 100. In other non-limiting examples, sensors 202 may also be positioned adjacent a back end of autonomous vehicle 100 as well.

The plurality of sensors 202 included on autonomous vehicle 100 are utilized in conjunction with an advanced driver assistance system (ADAS) and/or computing system 200 of autonomous vehicle 100. For example, sensors 202 obtain, gather, and/or receive data regarding the environment 10 including road 300 in which autonomous vehicle 100 is traveling on, surrounding driver vehicles 302, and/or objects positioned adjacent autonomous vehicle 100 traveling along road 300. The data obtained and/or detected by sensors 202 are processed by the ADAS and/or computing system 200 and is utilized to facilitate the generation or estimation of future driving patterns or spatial occupancy 306 (shown in phantom) for driver vehicles 302 and/or objects (see, FIGS. 7 and 8 described later) included on road 300. Specifically, sensors 202 positioned on autonomous vehicle 100 collect, detect, monitor, and/or gather data for driver vehicles 302 detected and/or traveling on road 300 adjacent to autonomous vehicle 100. The data detected by sensors 202 is further processed, analyzed, and/or evaluated by autonomy computing system 200 to translate the detected data into tangible and/or meaningful data that may be used by autonomy computing system 200 of autonomous vehicle 100 during operation and/or to facilitate the future, spatial occupancy 306 for driver vehicle 302 as it travels within environment 10. In non-limiting examples, detected and/or processed data for driver vehicles 302 may include, but are not limited to, a location of driver vehicle 302, a direction of travel for driver vehicle 302, a velocity/acceleration for driver vehicle 302, a size of driver vehicle 302, a distance between autonomous vehicle 100 and driver vehicle 302, or any other suitable data that is utilized by computing system 200 of autonomous vehicle 100 for facilitating the anticipating travel patterns or plans for vehicles 302 on road 300. In other non-limiting examples where the detected object is stationary (see, FIGS. 7 and 8), detected and/or processed object data for determining spatial occupancy 306 for the object may include, but are not limited to, the size of the object, the position of the object within road 300/environment 10, and/or the type of object that is detected. As discussed herein, spatial occupancy 306 for the object/driver vehicle 302 within environment 10 may only be determined, identified, and/or estimated for a predetermined period of time (e.g., three second) in the future, as data for the object and/or driver vehicle 302 is continuously detected and/or updated by sensors 202 of autonomous vehicle 100.

Furthermore, and as discussed herein, computing system 200 is configured to determine or identify a risk level for the autonomous vehicle 100 traveling on road 300 and/or control the operation of autonomous vehicle 100 based on the determined risk level. As discussed herein, sensors 202 are configured or formed as a variety of sensors including, but not limited to, radar sensors 210, LiDAR sensors 212, cameras 214, acoustic sensors 216, and/or temperature sensors 218.

Sensors 202 of autonomous vehicle 100, at least in part, define a predetermined detection or measurable area 308 (shown in phantom). More specifically, sensors 202 of autonomous vehicle 100 may define, outline, and/or generate measurable area 308 of environment 10 including road 300. Measurable area 308 of environment 10 is an area adjacent to and/or immediately in front of autonomous vehicle 100 in which sensors 202 may generate, obtain, or detect data about environment 10/road 300, driver vehicles 302 and/or objects disposed on and/or adjacent to road 300. In the non-limiting example, the measurable area 308 may include all three lanes (L1, L2, L3), and the shoulders (S1, S2) of road 300, as well as road verge (RV) of environment 10. The size of measurable area 308 is dependent, at least in part on, the types of sensors 202, the number of sensors 202, and/or the position or placement of sensors 202 on autonomous vehicle 100. Additionally, the size of measurable area 308 is also dependent, at least in part, on driving characteristics of autonomous vehicle 100. For example, the size of measurable area 308 may be dependent or based on, at least in part, the velocity of autonomous vehicle 100, the acceleration of autonomous vehicle 100, and/or the size of autonomous vehicle 100. In a non-limiting example, the size of measurable area 308 may increase as the velocity of autonomous vehicle 100 increases. As such and based on sensors 202 and/or driving characteristics of autonomous vehicle 100, measurable area 308 includes, is formed, and/or is detected a predetermined distance (D) from the front end of autonomous vehicle 100. Furthermore, and as discussed herein, measurable area 308 may also only include portions of road 300 that are viable or accessible driving options for autonomous vehicle 100 during typical driving occurrences (e.g., regular traffic flow in the lanes of road 300), and/or during emergency situations (e.g., driving on shoulder to avoid accident/debris on lanes).

The detection of data specific to environment 10 including road 300, driver vehicles 302, and/or objects included on road 300, as detected within the measurable area 308, facilitates determining and/or identifying a risk-level for autonomous vehicle 100 as it travels along road 300 and/or controlling autonomous vehicle 100 along road 300 based on the determined risk-level. For example, a risk-level for autonomous vehicle 100 traveling within environment 10 and/or on road 300 may be determined, identified, and/or estimated by performing various processes using the data generated and/or detected by the plurality of sensors 202 of autonomous vehicle 100, as well as drive characteristics for autonomous vehicle 100. Additionally, and as discussed herein, the determined risk-level, and associated data used to determine high-risk driving conditions for autonomous vehicle 100, may facilitate the controlling and/or adjusting of driving characteristics for autonomous vehicle 100, as well as provide additional data to autonomy computing system 200 to improve future driving patterns and conditions for autonomous vehicle 100.

For example, determining a risk level for autonomous vehicle 100 may include defining an anticipated spatial occupancy 310 (shown in phantom) for autonomous vehicle 100 within environment 10. More specifically, autonomy computing system 200 may define, determine, and/or establish anticipated spatial occupancy 310 for autonomous vehicle 100 traveling within environment 10 and/or along road 300. Anticipated spatial occupancy 310 may include the position, location, and/or future area in which autonomous vehicle 100 may be disposed within environment 10 at a predetermined future time. For example, FIG. 3 depicts a non-limiting example of anticipated spatial occupancy 310 for autonomous vehicle 100 three (3) seconds in the future. Anticipated spatial occupancy 310 for autonomous vehicle 100 may be defined based on driving characteristics of autonomous vehicle 100. For example, defining anticipated spatial occupancy 310 for autonomous vehicle 100 may include determining, detecting, and/or analyzing driving characteristics of autonomous vehicle 100 including, but not limited to, a velocity of autonomous vehicle 100, an acceleration of autonomous vehicle 100, a direction of travel of autonomous vehicle 100, a position of autonomous vehicle 100 within environment 10/road 300, and the like. Additionally, defining anticipated spatial occupancy 310 may include determining, detecting, and/or analyzing data about environment 10 and/or road 300 that may influence driving characteristics of autonomous vehicle 100. For example, anticipated spatial occupancy 310 may be defined based on, at least in part, data relating to the merging of lanes on road 300.

In some embodiments, defining anticipated spatial occupancy 310 may also include identifying and/or maintaining predefined driving rules or parameters for autonomous vehicle 100. For example, autonomy computing system 200, which controls and/or adjusts driving characteristics of autonomous vehicle 100, includes a predefined driving rule that ensures autonomous vehicle 100 travels along road 300 and maintains a minimum “Time to Collision” (TTC) parameter. The TTC parameter includes a predefined time that it will take autonomous vehicle 100 to stop to avoid a collision with an object or driver vehicle 302 positioned adjacent autonomous vehicle 100 on road 300. As such, defining anticipated spatial occupancy 310 for autonomous vehicle 100 may also include maintaining predefined driving rules or parameters for autonomous vehicle 100 (e.g., TTC parameter) traveling within environment 10 and/or on road 300. In the non-limiting example shown in FIG. 3, no driver vehicles 302 or objects are positioned within measurable area 308 and/or are positioned in front of autonomous vehicle 100. As such, the TTC parameter, while still maintained by autonomy computing system 200 may not affect the anticipated spatial occupancy 310. In other non-limiting examples where an object or driver vehicle 302 is positioned in front of autonomous vehicle 100 (see, FIG. 5 described later), the TTC parameter may facilitate the defining of anticipated spatial occupancy 310 for autonomous vehicle 100 within environment 10 and/or on road 300.

Determining or identifying a risk level for autonomous vehicle 100 traveling within environment 10 may also include computing drivable space 312 for autonomous vehicle 100 within environment 10. Drivable space 312 is based on, at least in part, the data detected by the plurality of sensors 202 of autonomous vehicle 100. More specifically, drivable space 312 is computed, determined, and/or defined based on, at least in part, the data detected by the plurality of sensors 202 relating environment 10 including road 300, driver vehicles 302 and/or objects included within environment 10. For example, computing drivable space 312 within environment 10 may include outlining measurable area 308 of environment 10 based on driving characteristics of autonomous vehicle 100 and/or operational parameters of sensors 202 of autonomous vehicle 100, as discussed herein. Additionally, computing drivable space 312 may include detecting, via the plurality of sensors 202, if an object and/or driver vehicles 302 is disposed within measurable area 308, and determining the object/driver vehicle 302 spatial occupancy 306 (See, FIG. 4 described later) within measurable area 308. As discussed herein, the spatial occupancy 306 for the object an/or driver vehicle 302 may be determined, detected, and/or estimated based on data including, but not limited to, a location of object/driver vehicle 302, a direction of travel for object/driver vehicle 302, a velocity/acceleration for object/driver vehicle 302, a size of object/driver vehicle 302, a distance between autonomous vehicle 100 and object/driver vehicle 302, or any other suitable data that is utilized by computing system 200 of autonomous vehicle 100 to facilitate the determining of the object/driver vehicle spatial occupancy 306. Finally, drivable space 312 for autonomous vehicle may be computed, defined, and/or determined within environment 10 as measurable area 308, minus or excluding the determined object or driver vehicle 302 spatial occupancy 306 for the object/driver vehicle 302 disposed within measurable area 308 of environment 10.

In the non-limiting example shown in FIG. 3, driver vehicle 302 is behind and/or adjacent autonomous vehicle 100. Additionally, driver vehicle 302 is not disposed within measurable area 308 at the time of defining measurable area 308, nor does the data detected by sensors 202 indicate that the spatial occupancy 306 of driver vehicle 302 will overlap and/or identify driver vehicle 302 as being positioned within measurable area 308 during the predetermined time (e.g., three (3) seconds). As such, driver vehicle 302 does not effect, and more specifically reduce, the size of drivable space 312 for autonomous vehicle 100. In the non-limiting example, drivable space 312 for autonomous vehicle 100 is equal to measurable area 308. For example, where no objects and/or driver vehicles 302 are disposed within measurable area 308 when determining the risk level for autonomous vehicle 100, the drivable space 312 is equal to measurable area 308 and/or the entirety of road 300 including the plurality of lanes (L), and shoulder(S), as well as road verge (RV) of environment 10.

Although drivable space 312 includes the entirety of road 300, it is understood that autonomous vehicle 100 may not travel or drive over every portion of road 300. For example, and as discussed herein, autonomy computing system 200 may determine that the first shoulder (S1) and second shoulder (S2) is included within drivable space 312, but may understand that autonomous vehicle 100 should not drive within first shoulder (S1) and/or second shoulder (S2) under non-emergency circumstances or conditions.

Additionally, determining a risk level for autonomous vehicle 100 traveling within environment 10 includes calculating a drivable space consumption (DSC) ratio. The DSC ratio is based on the defined, anticipated spatial occupancy 310 for autonomous vehicle 100 within environment 10, and drivable space 312 within environment 10. More specifically, the DSC ratio is based on the defined anticipated spatial occupancy 310 of autonomous vehicle 100, and drivable space 312 within environment 10, as defined and/or determined by the measurable area 308 and spatial occupancy 306 of objects and/or driver vehicle 302 disposed within measurable area 308. In a non-limiting example, the ratio may include an area comparison of anticipated spatial occupancy 310 for autonomous vehicle 100 and drivable space 312. In another non-limiting example, anticipated spatial occupancy 310 for autonomous vehicle 100 and drivable space 312 may be defined by and/or assigned a numerical value based on, at least in part, the data used to determine, define, and/or identify each of anticipated spatial occupancy 310 and drivable space 312, respectively. In one example, the calculated DSC ratio is equal to the value of anticipated spatial occupancy 310 for autonomous vehicle 100 divided by drivable space 312 within environment 10.

In non-limiting examples where anticipated spatial occupancy 310 for autonomous vehicle 100 and drivable space 312 may be defined by and/or assigned a numerical value, distinct portions of drivable space 312 may be assigned distinct numerical values and/or may be weighted differently. For example, distinct portions of environment 10 making up the computed drivable space 312 within environment 10 for autonomous vehicle 100 may include distinct numerical values when being facilitated to calculate the DSC ratio. For example, computing drivable space 312 within environment 10 may include assigning a accessibility weighted factor to each of lanes (L) of road 300, each shoulder(S) of road 300, and road verge (RV) of environment 10. In the example embodiment, the weighted factor assigned to each distinct portion of environment 10 may be distinct. More specifically, driving lanes (L) of road 300 may include a first weighted factor, and shoulders(S) of road 300 may include a second weighted factor that is less than the first weighted factor of driving lanes (L). Additionally, road verge (RV) of environment 10 may include a third weighted factor that is less than the first weighted factor of driving lanes (L) and the second weighted factor of shoulders(S) of road 300. In non-limiting examples, the weighted factors for each portion of environment 10 may be multiplied by the area (e.g., square footage) of each portion included within drivable space 312, and subsequently added together to determine, define, and/or compute drivable space 312 within environment 10 used to calculate the DSC ratio, as discussed herein.

The calculated DSC ratio may in turn identify and/or determine the risk level for autonomous vehicle 100. For example, the DSC ratio calculated based on anticipated spatial occupancy 310 for autonomous vehicle 100 and drivable space 312 within environment 10 may identify, determine, and/or establish the risk level for autonomous vehicle 100 traveling within environment 10. The calculated DSC ratio may be compared to a risk level threshold for autonomous vehicle 100 to determine the risk level. In response to the DSC ratio being greater than the risk level threshold, it may be determined that autonomous vehicle 100 is in a high-risk driving condition and/or circumstance. Alternatively, it may be determined that autonomous vehicle 100 is in a low-risk driving condition when the calculated DSC ratio is less than or equal to the risk level threshold. The risk level threshold includes a predefined number or value that is compared to the calculated DSC ratio for determining and/or identifying the level of risk. For example, the risk level threshold may equal "1." In the non-limiting example shown in FIG. 3, anticipated spatial occupancy 310 of autonomous vehicle 100 includes approximately 80 square feet (sq. ft.) (7.4 $m^2$) of second lane (L2) in which autonomous vehicle 100 is traveling within. Additionally in the non-limiting example, drivable space 312 is equal to the entirety of measurable area 308 which includes approximately 500 square feet (46.5 $m^2$) of environment 10 including road 300. In the example, the calculated DSC ratio is approximately 0.16 (e.g., 80 sq. ft./500 sq. ft.=0.16). As such, it may be determined that autonomous vehicle 100 shown in FIG. 3 is in a low-risk driving condition based on the calculated DSC ratio being below the risk level threshold.

As discussed herein, distinct portions of environment 10 may be weighted and/or include an accessibility weight factor. As shown in FIG. 3, anticipated spatial occupancy 310 of autonomous vehicle 100 includes approximately 80 square feet (7.4 $m^2$) of second lane (L2) in which autonomous vehicle 100 is traveling within. Additionally, drivable space 312 includes various portions of environment 10 and/or road 300. More specifically, drivable space 312 includes approximately 300 square feet (27.9 $m^2$) of lanes (L) forming road 300, approximately 150 square feet (13.9 $m^2$) of shoulders(S) forming road 300, and approximately 50 square feet (4.6 $m^2$) of road verge (RV) of environment 10. In the example embodiment, the accessibility weighted factor for lanes (L) of road 300 may equal "1.0," the accessibility weighted factor for shoulders(S) of road 300 may equal "0.5," and the accessibility weighted factor for road verge of environment may equal "0.1." As such, drivable space 312 may be approximately 380 square feet (35.3 $m^2$) after including the weighted factors (e.g., (300 sq. ft.×1.0)+ (150 sq. ft.×0.5)+ (50 sq. ft.×0.1)=380 sq. ft.). In the example, the calculated DSC ratio is approximately 0.21 (e.g., 80 sq. ft./380 sq. ft.=0.21). As such, it may be determined that autonomous vehicle 100 shown in FIG. 3 is in a low-risk driving condition based on the calculated DSC ratio being below the risk level threshold. As discussed herein, and in response to determining the risk-level for autonomous vehicle 100 includes a low-risk driving condition, driving characteristics of autonomous vehicle 100 may be maintained.

Figure 4:
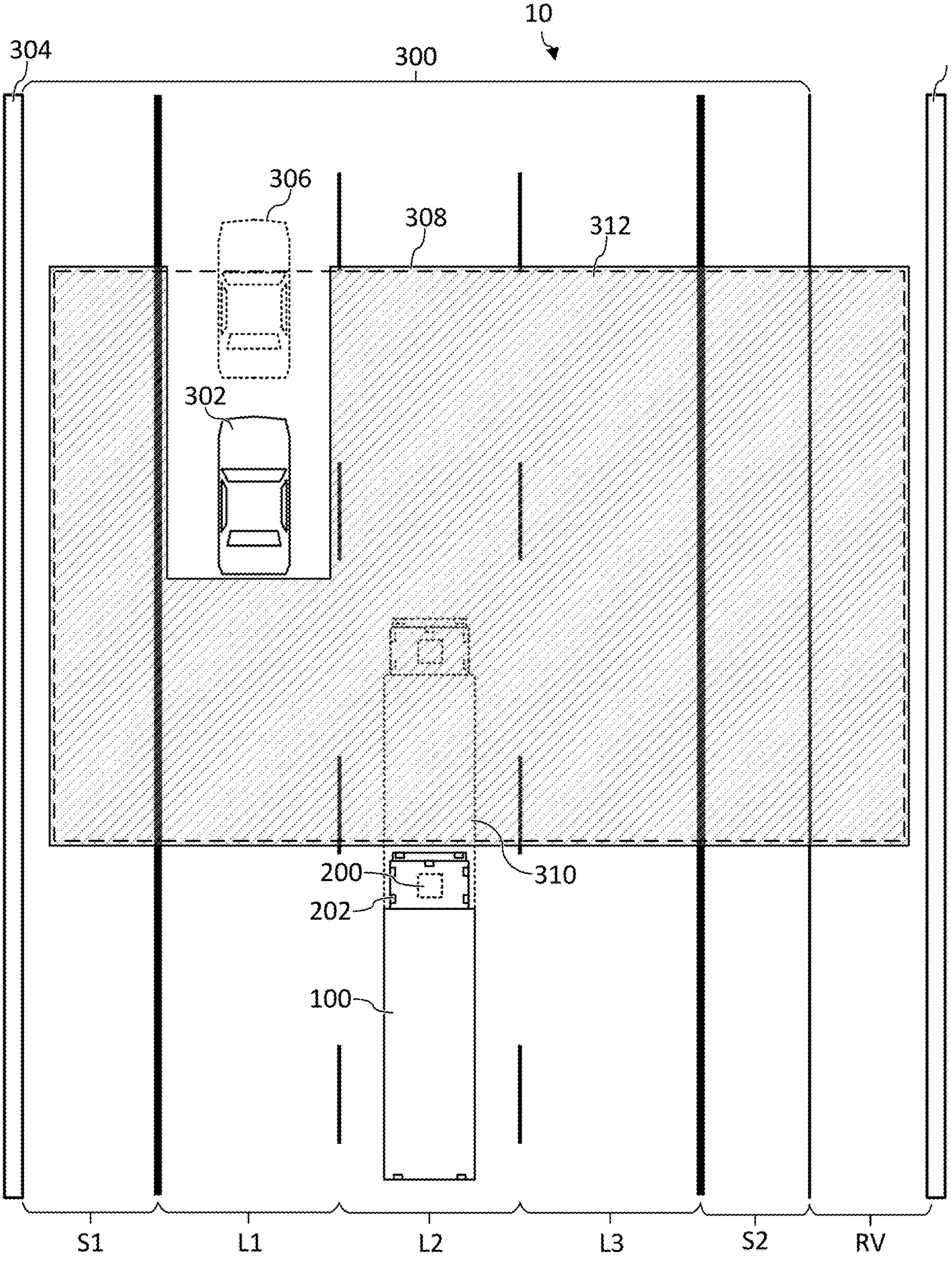
FIG. 4 is another ariel view of an autonomous vehicle and a driver vehicle traveling within an environment including a road and a road verge.

FIG. 4 is another aerial view of a portion of an environment 10 including a road 300, and driver vehicle 302 and autonomous vehicle 100 traveling along road 300. It is to be understood that similarly numbered and/or named components may function in a substantially similar fashion. Redundant explanation of these components has been omitted for clarity.

As shown in FIG. 4, driver vehicle 302 is disposed within measurable area 308. For example, driver vehicle 302 is traveling within environment 10, and more specifically within first lane (L1) of road 300, ahead or in front of autonomous vehicle 100. At the time of generating, defining, and/or outlining measurable area 308 to compute drivable space 312, driver vehicle 302 is also disposed within measurable area 308. As discussed herein, spatial occupancy 306 for driver vehicle 302 detected within measurable area 308 may be determined. More specifically, and based upon, at least in part, data for driver vehicles 302, autonomy computing system 200 of autonomous vehicle 100 may determine spatial occupancy 306 for driver vehicle 302 disposed within measurable area 308 to determine, define, and/or compute drivable space 312 for autonomous vehicle 100. As shown in the non-limiting example of FIG. 4, because driver vehicle 302 and/or spatial occupancy 306 of driver vehicle 302 is disposed within measurable area 308, drivable space 312 for autonomous vehicle 100 may be less than measurable area 308. Drivable space 312 may exclude the area in which driver vehicle 302 is disposed within measurable area 308, as well as the anticipated spatial occupancy 306 of driver vehicle 302 within measurable area 308.

In a non-limiting example, anticipated spatial occupancy 310 of autonomous vehicle 100 includes approximately 80 square feet (7.4 $m^2$) of second lane (L2) in which autonomous vehicle 100 is traveling within, and drivable space 312 is approximately 450 square feet (41.8 $m^2$) of environment 10 including road 300. With comparison to FIG. 3, approximately half of first lane (L1) may be excluded from the computed drivable space 312 within environment 10 because of driver vehicle 302 being disposed therein. In the example, the calculated DSC ratio is approximately 0.18 (e.g., 80 sq. ft./450 sq. ft.=0.18).

In another non-limiting example where each portion of environment is assigned a weighted factor, as similarly discussed herein with respect to FIG. 3, drivable space 312 may be approximately 330 square feet (30.7 $m^2$) after including the weighted factors (e.g., (250 sq. ft.×1.0)+ (150 sq. ft.×0.5)+ (50 sq. ft.×0.1)=330 sq. ft.). In the example, the calculated DSC ratio is approximately 0.24 (e.g., 80 sq. ft./330 sq. ft.=0.24). In either example discussed herein, it may be determined that autonomous vehicle 100 shown in FIG. 4 is in a low-risk driving condition based on the calculated DSC ratio being below the risk level threshold.

Figure 5:
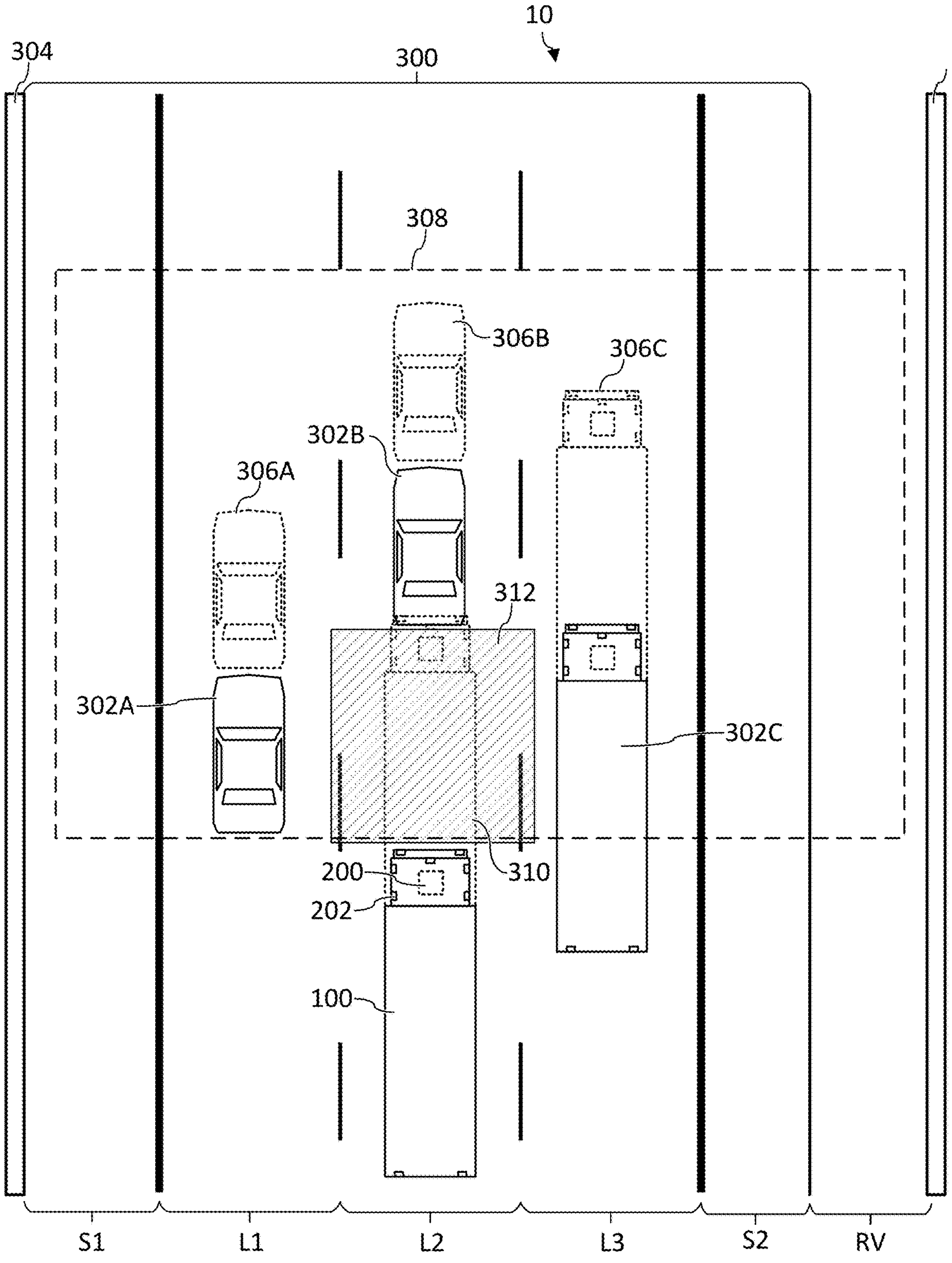
FIGS. 5 and 6 are ariel views of an autonomous vehicle and a plurality of driver vehicles traveling within an environment including a road and a road verge.

FIG. 5 is an additional aerial view of a portion of an environment 10 including a road 300, and driver vehicles 302A, 302B, 302C and autonomous vehicle 100 traveling along road 300. As shown in FIG. 5, a plurality of driver vehicles 302A, 302B, 302C are disposed within measurable area 308. For example, driver vehicle 302A is traveling within environment 10, and more specifically within first lane (L1) of road 300, ahead or in front of autonomous vehicle 100. Additionally, driver vehicle 302B is traveling within second lane (L2) of road 300, ahead of autonomous vehicle 100, and driver vehicle 302C is traveling within third lane (L3) of road 300, ahead of and adjacent to autonomous vehicle 100. At the time of generating, defining, and/or outlining measurable area 308 to compute drivable space 312, driver vehicles 302A, 302B, 302C are also all disposed within measurable area 308. As discussed herein, spatial occupancy 306A, 306B, 306C for driver vehicles 302A, 302B, 302C detected within measurable area 308 may be determined. As shown in the non-limiting example of FIG. 5, because driver vehicles 302A, 302B, 302C and/or spatial occupancy 306A, 306B, 306C of driver vehicles 302A, 302B, 302C are all disposed within measurable area 308, substantially adjacent to autonomous vehicle 100, drivable space 312 for autonomous vehicle 100 may be less than measurable area 308. Drivable space 312 may exclude the area in which driver vehicles 302A, 302B, 302C is disposed within measurable area 308, as well as the anticipated spatial occupancy 306A, 306B, 306C of driver vehicles 302A, 302B, 302C within measurable area 308.

Additionally, as shown, inaccessible and/or occluded portions of environment 10 may also be excluded from drivable space 312 for autonomous vehicle 100. For example, first shoulder (S1), although not occupied by driver vehicle 302A (or an object) may also be excluded from drivable space 312 because first shoulder (S1) is not accessible by autonomous vehicle 100 traveling within environment 10. For example, autonomy computing system 200 may determine that in order to move autonomous vehicle 100 into first shoulder (S1), around driver vehicle 302A, autonomous vehicle 100 may be required to include driving characteristics that may violate predefined driving rules (e.g., minimum "Time to Collision" (TTC) parameter). In view of this, first shoulder (S1), as well as second shoulder (S2) and road verge (RV), may be excluded from drivable space 312 within environment 10 for autonomous vehicle 100.

In a non-limiting example, anticipated spatial occupancy 310 of autonomous vehicle 100 includes approximately 80 square feet (7.4 $m^2$) of second lane (L2) in which autonomous vehicle 100 is traveling within, and drivable space 312 is approximately 70 square feet (6.5 $m^2$) of environment 10 including road 300. In the example, the calculated DSC ratio is approximately 1.14 (e.g., 80 sq. ft./70 sq. ft.=1.14). In another non-limiting example where each portion of environment is assigned a weighted factor, as similarly discussed herein with respect to FIG. 3, drivable space 312 may be approximately 70 square feet (6.5 $m^2$) after including the weighted factors (e.g., (70 sq. ft.×1.0)+ (0 sq. ft.×0.5)+ (0 sq. ft.×0.1)=70 sq. ft.). In the weighted factor example, the calculated DSC ratio is also approximately 1.14 (e.g., 80 sq. ft./70 sq. ft.=1.14). In either example, it may be determined that autonomous vehicle 100 shown in FIG. 5 is in a high-risk driving condition based on the calculated DSC ratio being above the risk level threshold (e.g., "1"). As discussed herein, and in response to determining the risk-level for autonomous vehicle 100 includes a high-risk driving condition, driving characteristics of autonomous vehicle 100 may be adjusted by autonomy computing system 200. Additionally as discussed herein, data and/or information relating to a high-risk driving condition for autonomous vehicle 100 may facilitate the learning and/or adjustment of future driving characteristics for autonomous vehicle 100.

Figure 6:
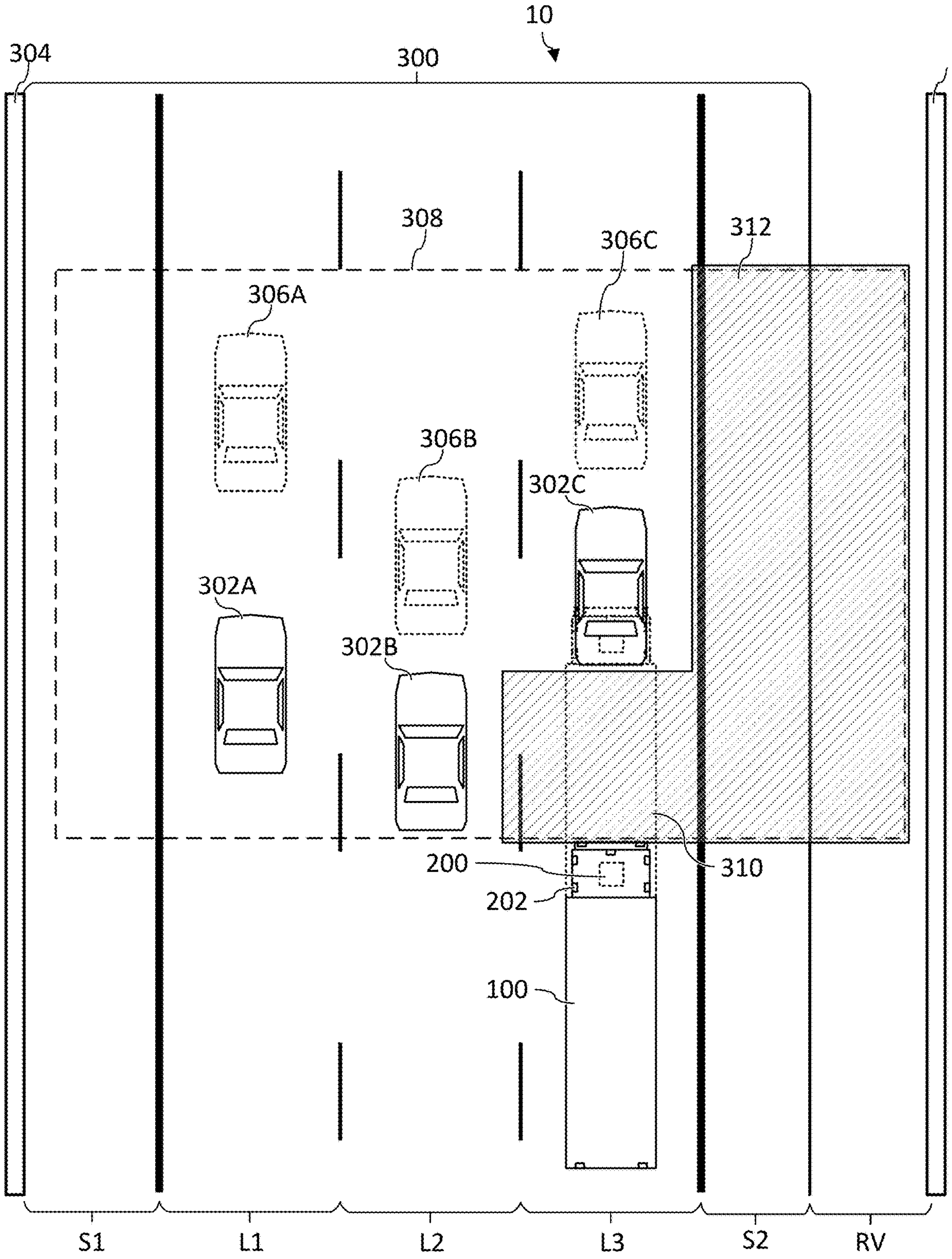

FIG. 6 is a further aerial view of a portion of an environment 10 including a road 300, and driver vehicle 302A, 302B, 302C and autonomous vehicle 100 traveling along road 300. As shown in FIG. 6, a plurality of driver vehicles 302A, 302B, 302C are disposed within measurable area 308. For example, driver vehicle 302A is traveling within first lane (L1) of road 300, ahead or in front of autonomous vehicle 100 traveling in third lane (L3), and driver vehicle 302B is traveling within second lane (L2) of road 300, ahead of autonomous vehicle 100. Additionally, in the non-limiting example, driver vehicle 302C is disposed within measurable area 308, and traveling within third lane (L3) of road 300. As shown in the non-limiting example of FIG. 6, and as similarly discussed herein, because driver vehicles 302A, 302B, 302C and/or spatial occupancy 306A, 306B, 306C of driver vehicles 302A, 302B, 302C are all disposed within measurable area 308, drivable space 312 for autonomous vehicle 100 may be less than measurable area 308. More specifically, drivable space 312 may exclude the area in which driver vehicles 302A, 302B, 302C are disposed within measurable area 308, as well as the anticipated spatial occupancy 306A, 306B, 306C of driver vehicles 302A, 302B, 302C within measurable area 308.

In a non-limiting example, anticipated spatial occupancy 310 of autonomous vehicle 100 includes approximately 80 square feet (7.4 $m^2$) of second lane (L2) in which autonomous vehicle 100 is traveling within, and drivable space 312 is approximately 155 square feet (14.4 $m^2$) of environment 10 including road 300. In the example, the calculated DSC ratio is approximately 0.52 (e.g., 80 sq. ft./155 sq. ft.=0.52). In this example, it may be determined that autonomous vehicle 100 shown in FIG. 5 is in a low-risk driving condition based on the calculated DSC ratio being below the risk level threshold (e.g., "1").

In another non-limiting example where each portion of environment is assigned a weighted factor, drivable space 312 is approximately 72.5 square (6.7 $m^2$) feet after including the weighted factors (e.g., (30 sq. ft.×1.0)+ (75 sq. ft.×0.5)+ (50 sq. ft.×0.1)=72.5 sq. ft.). In the weighted factor example, the calculated DSC ratio is also approximately 1.10 (e.g., 80 sq. ft./72.5 sq. ft.=1.10). In the weighted factor example, it may be determined that autonomous vehicle 100 shown in FIG. 5 is in a high-risk driving condition based on the calculated DSC ratio being above the risk level threshold (e.g., "1").

Figure 7:
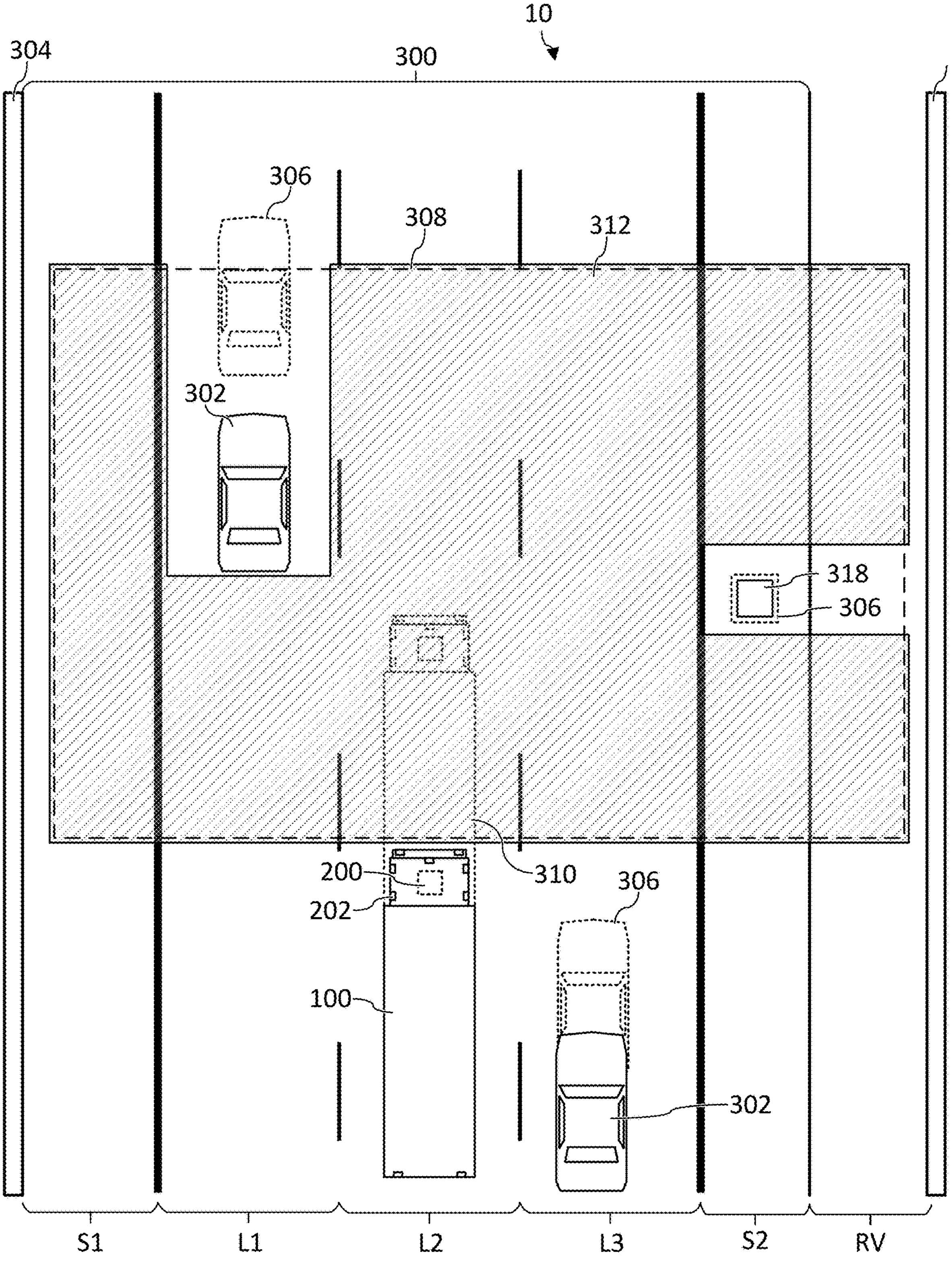
FIGS. 7 and 8 are ariel views of an autonomous vehicle and driver vehicle(s) traveling within an environment including a road and a road verge, as well as an object(s) disposed within the environment.
Figure 8:
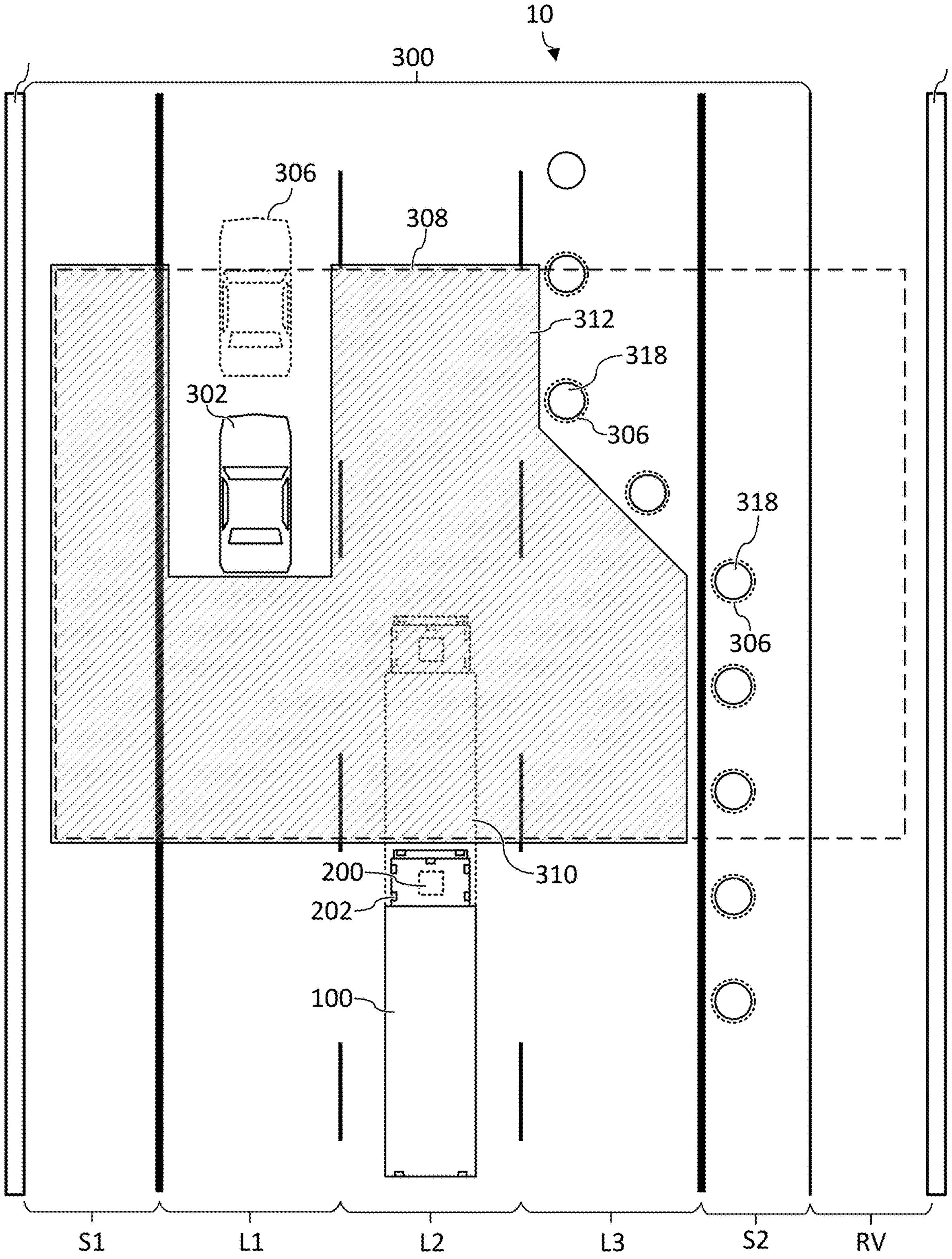

FIGS. 7 and 8 are additional aerial views of a portion of an environment 10 including a road 300, and driver vehicle(s) 302 and autonomous vehicle 100 traveling along road 300. It is to be understood that similarly numbered and/or named components may function in a substantially similar fashion. Redundant explanation of these components has been omitted for clarity.

In addition to including driver vehicle(s) 302 within measurable area 308, environment 10 may also include objects 318. More specifically, stationary objects 318 may be disposed within environment 10 and measurable area 308 outlined to compute drivable space 312 for autonomous vehicle 100 within environment 10. As discussed herein, and similar to driver vehicle(s) 302, object data may be detected, processed, and/or analyzed for determining spatial occupancy 306 for objects 318. The object data detected, by the plurality of sensors 202 of autonomous vehicle 100, may include, but is not limited to, the size of the object, the position of the object within road 300/environment 10, and/or the type of object that is detected. In the non-limiting example shown in FIG. 7, a single, stationary object 318 (e.g., debris) positioned within second shoulder (S2) may only exclude a portion of second shoulder (S2) and road verge (RV) from drivable space 312 for autonomous vehicle 100. Conversely, the plurality of arranged stationary objects 318 (e.g., traffic cones) shown in FIG. 8 may exclude all of second shoulder (S2) of road 300, and road verge (RV) of environment, as well as a portion of third lane (L3) of road 300, from drivable space 312 for autonomous vehicle 100.

As discussed herein, determining the DSC ratio and/or determining a risk level for autonomous vehicle 100 traveling within environment 10 may be utilized by autonomy computing system 200 to control and/or adjust future driving characteristics for autonomous vehicle 100. For example, autonomy computing system 200 of autonomous vehicle 100 may determine the DSC ratio for autonomous vehicle 100 based on anticipated spatial occupancy 310 for autonomous vehicle 100 and drivable space 312 within environment 10, and determine a risk level (e.g., high risk, low risk) for autonomous vehicle 100 based on the determined DSC ratio, as discussed herein. The determined DSC ratio and/or determined risk level, as well as the detected data enabling the determination and/or identification, may be fed back into 200 to adjust immediate drive characteristics of autonomous vehicle 100. Additionally, or alternatively, the determined DSC ratio, the determined risk level, and the associated, detected data, may be continuously provided to autonomy computing system 200 to adjust future driving characteristics for autonomous vehicle 100, as discussed herein.

In a non-limiting example, adjusting driving characteristics for autonomous vehicle 100 may take place after determining the DSC ratio and determining the risk-level for autonomous vehicle 100 based on the determined DSC ratio. More specifically, driving characteristic of autonomous vehicle 100 traveling in environment 10 may be adjusted in response to determining the risk level for autonomous vehicle 100 includes a high-risk driving condition. Returning to FIG. 5, for example, autonomy computing system 200 may determine the DSC ratio is 1.14. In the example, autonomy computing system 200 may also identify or determine that autonomous vehicle 100 shown in FIG. 5 is in a high-risk driving condition based on the calculated DSC ratio being above or greater than the risk level threshold (e.g., "1"). In this example, autonomy computing system 200 may adjust driving characteristics of autonomous vehicle 100 to adjust, change, and/or alter the risk level. For example, autonomy computing system 200 may adjust the velocity, the acceleration, and/or the position (e.g., lane shift to third lane (L3)) of autonomous vehicle 100 within environment 10 to change the risk level from a high-risk driving condition to a low-risk driving condition.

Alternatively, when the risk level for autonomous vehicle 100 traveling within environment 10 is determined to be low-risk (see, FIGS. 3 and 4), driving characteristics for autonomous vehicle 100 may be maintained. More specifically, autonomy computing system 200 of autonomous vehicle 100 may maintain the driving characteristics of autonomous vehicle 100 traveling in environment 10 in response to the risk level for autonomous vehicle 100 including a low-risk driving condition (e.g., DSC ratio is ≤risk level threshold).

In another non-limiting example, the adjustment of driving characteristics for autonomous vehicle 100 may take place after a predetermined period of time or after a time threshold. For example, prior to adjusting driving characteristics for autonomous vehicle 100, a duration of time in which the risk level for autonomous vehicle 100 includes the high-risk driving condition may be determined, detected, and/or identified. The duration of time represents the continuous time in which autonomous vehicle 100 remains in the high-risk driving condition. The determine duration of time is then compared to a high-risk time threshold, which includes a predetermined or predefined time. In an example where the determined duration of time in which autonomous vehicle 100 includes the high-risk driving condition is less than the high-risk time threshold, driving characteristics for autonomous vehicle 100 may be maintained. Conversely, where the determined duration of time in which autonomous vehicle 100 includes the high-risk driving condition is equal to or greater than the high-risk time threshold, driving characteristics may be adjusted, altered, and/or changed, as similarly discussed herein.

In addition to real-time feedback and/or immediate alterations to driving characteristics of autonomous vehicle 100, data used to determine the DSC ratio and/or determine the risk level for autonomous vehicle 100 may be used to adjust future driving characteristics for autonomous vehicle 100. For example, data collected by sensors 202 and processed by autonomy computing system 200 may be fed back into and analyzed by autonomy computing system 200. For example, driving characteristics for autonomous vehicle 100 may be analyzed by autonomy computing system 200 in response to the determined risk level for autonomous vehicle 100 including the high-risk driving condition. Additionally, autonomy computing system 200 may analyze the generated data relating to environment 10 surrounding autonomous vehicle 100 and at least one object (e.g., driver vehicle 302, object 318) included within environment 10 in response to the risk level for autonomous vehicle 100 including the high-risk driving condition. Analyzing the driving characteristics and the generated data in turn allows autonomy computing system 200 to adjust future driving characteristics for autonomous vehicle 100 to improve the operation of autonomous vehicle 100. In non-limiting examples, adjusting future driving characteristics for autonomous vehicle 100 may reduce and/or prevent autonomous vehicle 100 from operating in high-risk driving conditions. In examples where autonomy computing system 200 utilizes artificial intelligence, machine-learning, and/or configurable algorithms to operate autonomous vehicle 100, the adjusting of future characteristics may also improve the learning processes for autonomy computing system 200 operating autonomous vehicle 100.

Figure 9:
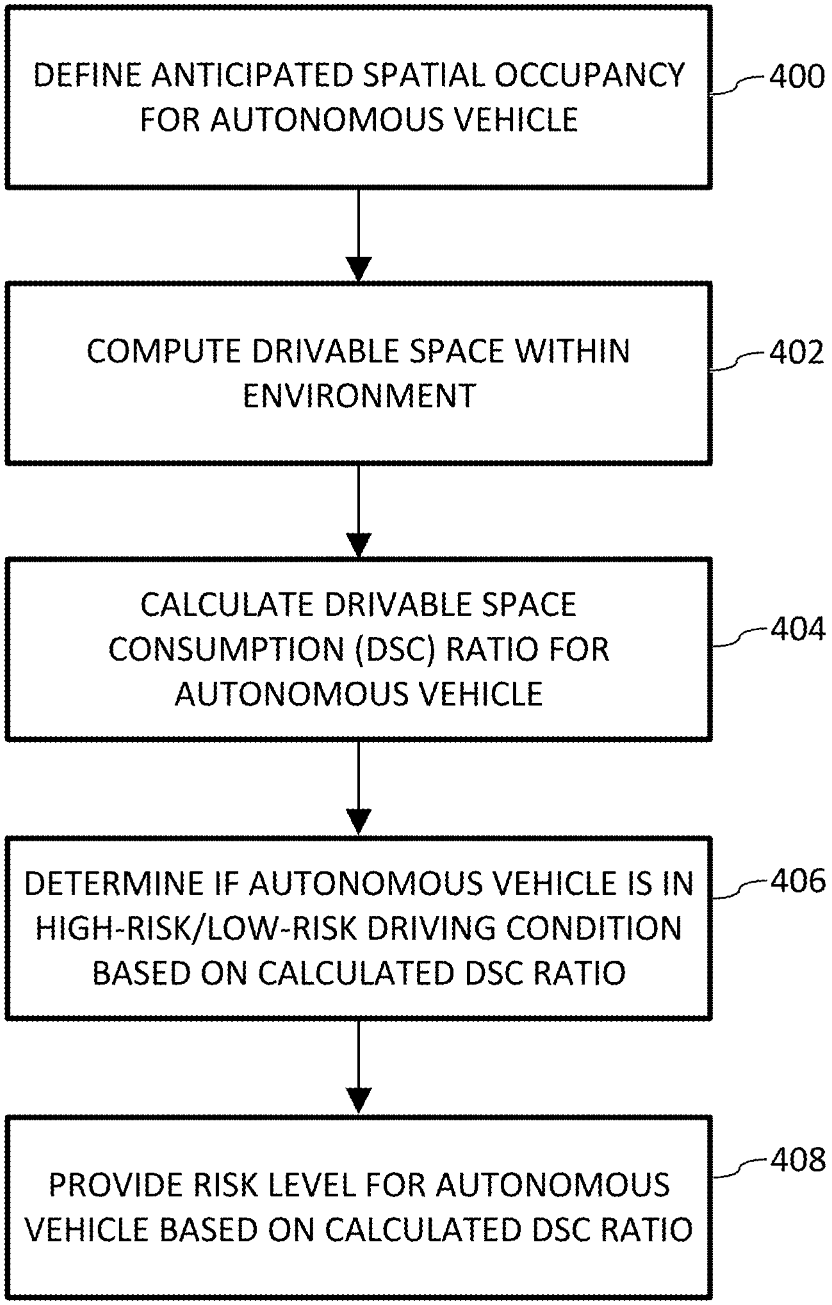
FIG. 9 is a flowchart illustrating a process for identifying a risk level for an autonomous vehicle traveling within an environment.

FIG. 9 is an example processes for identifying or determining a risk level for an autonomous vehicle. Specifically, FIG. 9 shows a flowchart depicting example processes for determining a risk level for an autonomous vehicle traveling within an environment including a road. In some cases, the processes may be performed using autonomous vehicle 100, as discussed above with respect to FIGS. 1-8, and autonomy computing system 200 shown and discussed herein with respect to FIGS. 2-8.

In process 400, an anticipated spatial occupancy for the autonomous vehicle is defined. More specifically, driving characteristics of the autonomous vehicle facilitates the defining, determining, and/or identifying of an anticipated spatial occupancy for the autonomous vehicle over a predetermined period of time. In non-limiting examples, defining the anticipated spatial occupancy for the autonomous vehicle may include determining driving characteristics for the autonomous vehicle that may include, but is not limited to, a velocity of the autonomous vehicle, an acceleration of the autonomous vehicle, a direction of travel of the autonomous vehicle, a position of the autonomous vehicle within the environment, and the like. Additionally, defining the anticipated spatial occupancy for the autonomous vehicle may include maintaining a predefined time to collision ("TTC") threshold for the autonomous vehicle traveling in the environment.

In process 402, a drivable space within the environment may be identified or computed for the autonomous vehicle. The drivable space is computed based on, at least in part, data detected by a plurality of sensors included on the autonomous vehicle. Computing, determining, and/or defining the drivable space within the environment may include outlining a measurable area of the environment. The measurable area may be based and/or dependent upon, at least in part, the driving characteristics of the autonomous vehicle and operational parameters of the plurality of sensors disposed on the autonomous vehicle. As such, outlining the measurable area may also include detecting the measurable area of the environment within a predetermined distance from the autonomous vehicle using the plurality of sensors disposed on the autonomous vehicle. In a non-limiting example, the environment may include a road including at least one driving lane and a shoulder positioned adjacent the driving lane(s). Additionally, the environment in which the autonomous vehicle travels within may include at least one road verge (e.g., grass) positioned adjacent the shoulder of the road. In non-limiting examples, computing the drivable space within the environment may include detecting, via the plurality of sensors, at least one object (e.g., stationary object, driver vehicles) disposed within the measurable area of the environment, and determining an object spatial occupancy for the object disposed within the measurable area of the environment. The object spatial occupancy for the object(s) is based on, at least in part, object data for the object(s) as detected by the plurality of sensors of the autonomous vehicle. Object data may include, but is not limited to, a velocity of the object(s), an acceleration of the object(s), a direction of travel of the object(s), a position of the object(s) within the environment, a size of the object(s), and/or the like. Furthermore, computing the drivable space within the environment may include defining the drivable space within the environment as the outlined measurable area of the environment excluding the determined object spatial occupancy for the object(s) disposed within the measurable area.

In one example the computed drivable space within the environment may include the area (e.g., square footage) of the outlined, measurable area minus any spatial occupancy for object(s) included within the measurable area. In other non-limiting examples, portions of the drivable space may be weighted differently. Computing the drivable space within the environment may also include assigning an accessibility weighted factor to the driving lane(s) of the road, the shoulder(s) of the road, and/or the road verge of the environment. In the non-limiting example, the driving lane of the road includes a first weight, the shoulder of the road includes a second weight, less than first weight, and the road verge includes a third weight, less than the second weight.

In process 404, a drivable space consumption (DSC) ratio is calculated. More specifically, a DSC ratio is calculated, determined, and/or computed based on the defined, anticipated spatial occupancy for the autonomous vehicle (e.g., process 400), and the computed drivable space within the environment for the autonomous vehicle (e.g., process 402). In non-limiting examples, the areas of each of the anticipated spatial occupancy and the drivable space may be compared, and more specifically, the anticipated spatial occupancy may be divided by the drivable space, to calculate the DSC ratio.

In process 406, a risk level for the autonomous vehicle traveling within the environment may be determined. The risk level for the autonomous vehicle may be determined and/or identified by comparing the calculated DSC ratio to a predefined risk level threshold. For example, it may be determined that the autonomous vehicle is in a high-risk driving condition in response to the calculated DSC ratio being greater than a threshold. Conversely, it may be determined that the autonomous vehicle is in a low-risk driving condition in response to the calculated DSC ratio being less than or equal to the threshold.

In process 408, the risk level for the autonomous vehicle may be provided. More specifically, the determined risk level (e.g., process 406) based on the calculated DSC ratio (e.g., process 404) may be provided, displayed, and/or visually presented. In non-limiting examples, the risk level may be provided and/or visually presented to an operator of the autonomous vehicle, or alternatively, may be provided on a computing device or system (e.g., autonomy computing system) that may control or monitor the operation of the autonomous vehicle. Providing the determined risk level may notify operators and/or observers of the autonomous vehicle when the autonomous vehicle is in high-risk driving conditions, and potential subsequent action may be taken (e.g., adjusting driving characteristics of the autonomous vehicle).

Figure 10:
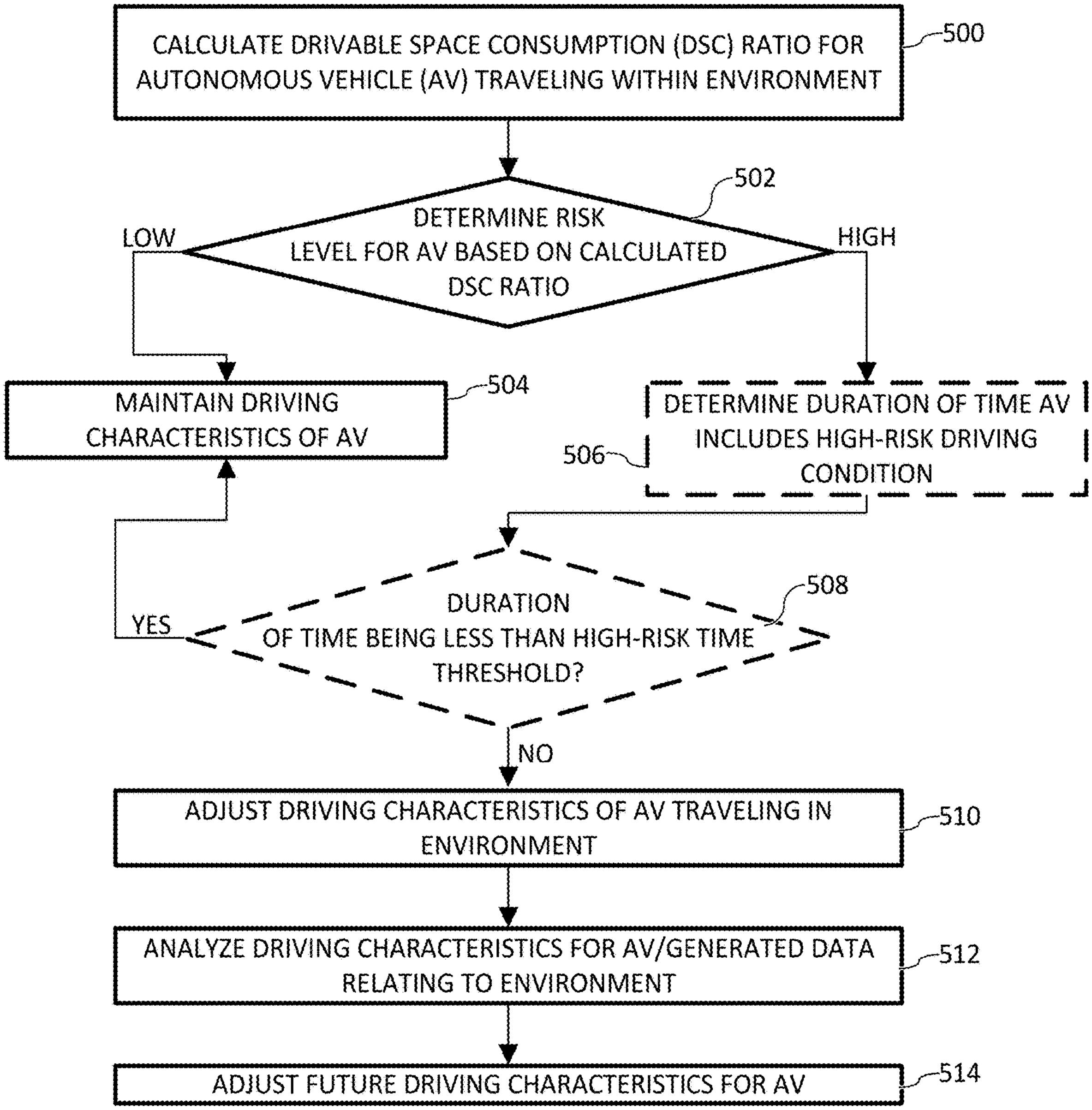
FIG. 10 is a flowchart illustrating a process for controlling an autonomous vehicle traveling within an environment.

FIG. 10 is an example processes for controlling an autonomous vehicle. Specifically, FIG. 10 shows a flowchart depicting example processes for controlling an autonomous vehicle traveling within an environment including a road. In some cases, the processes may be performed using autonomous vehicle 100, as discussed above with respect to FIGS. 1-8, and autonomy computing system 200 shown and discussed herein with respect to FIGS. 2-8.

In process 500, a drivable space consumption (DSC) ratio may be continuously determined or calculated for the autonomous vehicle. More specifically, the DSC ratio for the autonomous vehicle traveling within the environment may be continuously determined, detected, and/or calculated. As similarly discussed herein, calculating the DSC ratio may including defining an anticipated spatial occupancy for the autonomous vehicle within the environment (see, process 400; FIG. 9), computing a drivable space within the environment based on the data generated by a plurality of sensors of the autonomous vehicle (see, process 402; FIG. 9), and calculating the DSC ratio (see, process 404; FIG. 9). Calculating the DSC ratio is based on, at least in part, the defined, anticipated spatial occupancy for the autonomous vehicle within the environment and the computed drivable space within the environment.

In process 502, a risk level for the autonomous vehicle traveling within the environment may be identified or determined. The risk level for the autonomous vehicle may be identified or determined by comparing the calculated DSC ratio to a predefined risk level threshold. For example, it may be determined that the autonomous vehicle is in a low-risk driving condition in response to the calculated DSC ratio being less than or equal to the risk-level threshold. In response to determining the risk level for the autonomous vehicle is low (e.g., "LOW" at process 502), processes for controlling the autonomous vehicle proceeds to process 504. Conversely, it may be determined that the autonomous vehicle is in a high-risk driving condition in response to the calculated DSC ratio being greater than a threshold. In response to determining the risk level for the autonomous vehicle is high (e.g., "HIGH" at process 502), processes for controlling the autonomous vehicle proceeds to process 506.

In process 504, driving characteristics for autonomous vehicle may be maintained. Mor specifically, and in response to the determined risk level for the autonomous vehicle including the low-risk driving condition (e.g., "LOW" at process 502), the driving characteristics of the autonomous vehicle traveling in the environment may be maintained, continued, and/or unaltered.

In process 506, shown in phantom as optional, a duration of time in which the autonomous vehicle includes the high-risk driving condition may be determined. More specifically, and in response to the determined risk level for the autonomous vehicle including the high-risk driving condition (e.g., "HIGH" at process 502), it may be determined how long (e.g., duration of time) the autonomous vehicle is continuously operating and/or traveling within the environment under high-risk driving conditions.

In process 508, shown in phantom as optional, it is determined if the duration of time for the autonomous vehicle is less than the high-risk time threshold. The duration of time in which the autonomous vehicle operates at the high-risk driving condition may be compared to a predetermined and/or predefined high-risk time threshold. In a non-limiting example, it may be determined that the autonomous vehicle is operating in the high-risk driving condition for less than the high-risk time threshold when the determined duration of time (e.g., process 506) is below the predefined high-risk time threshold (e.g., "YES" at process 508). In this example, processes for controlling the autonomous vehicle proceeds (back) to process 504, and driving characteristics of the autonomous vehicle are maintained, as similarly discussed herein. In another non-limiting example, it may be determined that the autonomous vehicle is operating in the high-risk driving condition for the same or less time the high-risk time threshold when the determined duration of time (e.g., process 506) is equal to or greater than the predefined high-risk time threshold (e.g., "NO" at process 508). In response, processes for controlling the autonomous vehicle proceeds to process 510.

In process 510, driving characteristics of the autonomous vehicle traveling in the environment are adjusted. More specifically, and in response to determining the risk level for the autonomous vehicle includes a high-risk driving condition (e.g., "HIGH" at process 502), driving characteristics for the autonomous vehicle may be adjusted, changed, and/or altered. Driving characteristics of the autonomous vehicle are adjusted, changed, and/or altered to change the risk level from the high risk-level to the low risk level. For example, the velocity, the acceleration, and/or the position of the autonomous vehicle may be adjusted within the environment to change the risk level from a high-risk driving condition to a low-risk driving condition.

In process 512 driving characteristics for the autonomous vehicle and/or generated data relating to the environment may be further analyzed. More specifically, the driving characteristics for the autonomous vehicle may be analyzed, processed, and/or evaluated in response to the risk level for the autonomous vehicle including the high-risk driving condition. Additionally, the generated data relating to the environment surrounding the autonomous vehicle and the at least one object included within the environment may be analyzed, processed, and/or evaluated in response to the determined risk level for the autonomous vehicle including the high-risk driving condition.

In process 514, future driving characteristics for the autonomous vehicle may be adjusted. More specifically, future driving characteristics for the autonomous vehicle may be adjusted, altered, and/or changed based on the analyzed driving characteristics for the autonomous vehicle and the analyzed generated data relating to the environment and the at least one object (e.g., process 512). Analyzing the driving characteristics and the generated data in turn facilitates the adjustment of future driving characteristics for the autonomous vehicle to improve the operation of the autonomous vehicle. In non-limiting examples, adjusting future driving characteristics for the autonomous vehicle may reduce and/or prevent the autonomous vehicle from operating in high-risk driving conditions based on previously detected and/or analyzed driving characteristics and/or generated data. In examples where the autonomous vehicle utilizes artificial intelligence, machine-learning, and/or configurable algorithms to operate, the adjusting of future characteristics may also improve the learning processes for operating autonomous vehicle.

Figure 11:
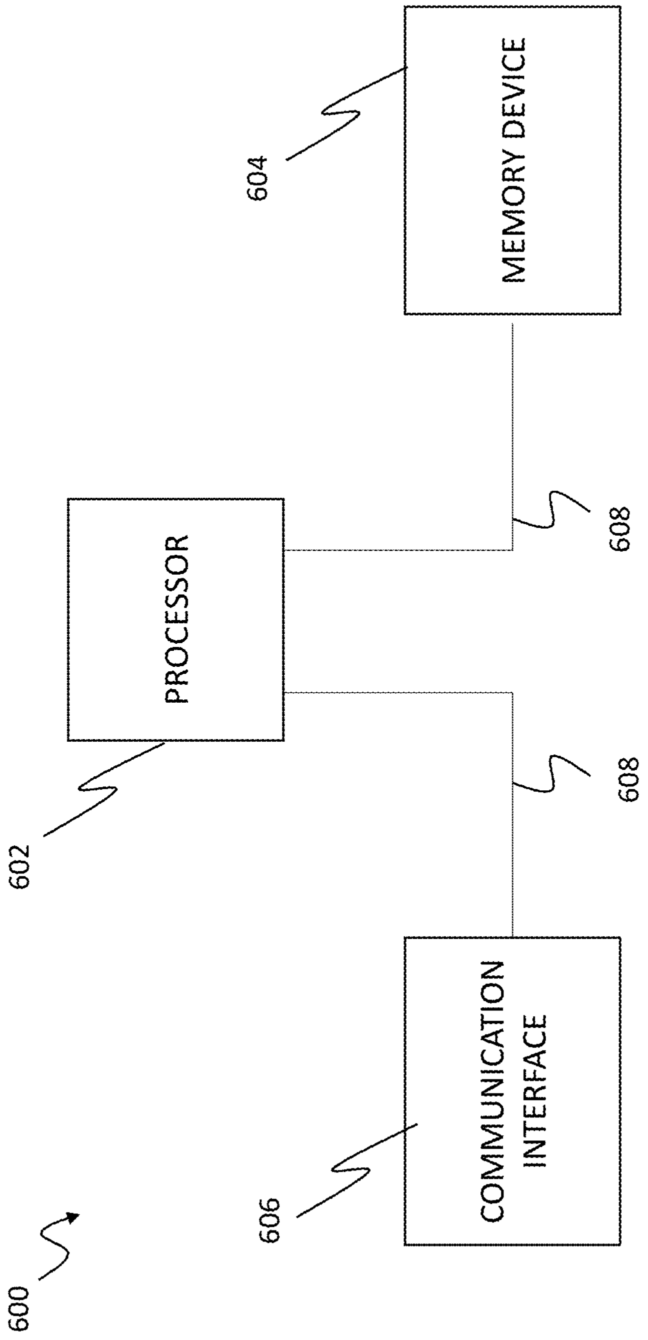
FIG. 11 is a block diagram of an example computing device.

FIG. 11 is a block diagram of an example computing device 600. The processes 400, 00 may be implemented on the computing device 600. The autonomy computing system 200 or part of the autonomy computing system 200 may be implemented with the computing device 600. The computing device 600 includes a processor 602 and a memory device 604. The processor 602 is coupled to the memory device 604 via a system bus 608. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition or meaning of the term "processor."

In the example embodiment, the memory device 604 includes one or more devices that enable information, such as executable instructions or other data (e.g., sensor data), to be stored and retrieved. Moreover, the memory device 604 includes one or more computer readable media, such as, without limitation, dynamic random access memory (DRAM), static random access memory (SRAM), a solid state disk, or a hard disk. In the example embodiment, the memory device 604 stores, without limitation, application source code, application object code, configuration data, additional input events, application states, assertion statements, validation results, or any other type of data. The computing device 600, in the example embodiment, may also include a communication interface 606 that is coupled to the processor 602 via system bus 608. Moreover, the communication interface 606 is communicatively coupled to data acquisition devices.

In the example embodiment, processor 602 may be programmed by encoding an operation using one or more executable instructions and providing the executable instructions in the memory device 604. In the example embodiment, the processor 602 is programmed to select a plurality of measurements that are received from data acquisition devices.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. More specifically, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

An example technical effect of the systems, program products, and methods for controlling an autonomous vehicle, as described herein, includes at least one of: (a) determining when the autonomous vehicle is in high/low risk driving conditions, (b) improving the safety and control of the autonomous vehicle by identifying high-risk driving conditions for the autonomous vehicle and adjusting driving characteristics of the autonomous vehicle accordingly, or (c) improving future operation of the autonomous vehicle by continuously analyzing data surrounding the high-risk driving conditions and adjusting drive characteristics to prevent and/or minimize the instances when the autonomous vehicle includes and/or operates under high-risk driving conditions.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. An autonomous vehicle comprising:

one or more sensors configured to detect data relating to an environment surrounding the autonomous vehicle and at least one object included within the environment; and at least one autonomy computing system in communication with the one or more sensors, the at least one autonomy computing system comprising at least one processor in communication with at least one memory device, and the at least one processor is programmed to:

calculate a drivable space consumption (DSC) ratio for the autonomous vehicle traveling within the environment based on an anticipated spatial occupancy for the autonomous vehicle within the environment and a drivable space within the environment;

determine a risk level for the autonomous vehicle based on the calculated DSC ratio; and adjust driving characteristics for the autonomous vehicle traveling in the environment in response to the determined risk level for the autonomous vehicle including a high-risk driving condition, wherein the at least one processor is further programmed to determine the risk level for the autonomous vehicle by:

prior to adjusting the driving characteristics of the autonomous vehicle, determining a duration of time in which the determined risk level for the autonomous vehicle includes the high-risk driving condition;

comparing the determined duration of time to a high-risk time threshold;

maintaining the driving characteristics of the autonomous vehicle traveling in the environment in response to the determined duration of time being less than the high-risk time threshold; and adjusting the driving characteristics of the autonomous vehicle in response to the determined duration of time being equal to or greater than the high-risk time threshold.

2. The autonomous vehicle of claim 1, wherein the at least one processor of the at least one autonomy computing system is further programed to:

determine the autonomous vehicle is in the high-risk driving condition in response to the calculated DSC ratio being equal to or greater than a threshold; and determine the autonomous vehicle is in a low-risk driving condition in response to the calculated DSC ratio being less than the threshold.

3. The autonomous vehicle of claim 2, wherein the at least one processor of the at least one autonomy computing system is further programed to:

maintain the driving characteristics of the autonomous vehicle traveling in the environment in response to the determined risk level for the autonomous vehicle includes the low-risk driving condition.

4. The autonomous vehicle of claim 1, wherein the at least one processor of the at least one autonomy computing system is further programed to:

analyze the driving characteristics for the autonomous vehicle in response to the determined risk level for the autonomous vehicle including the high-risk driving condition;

analyze detected data relating to the environment surrounding the autonomous vehicle and the at least one object included within the environment in response to the determined risk level for the autonomous vehicle including the high-risk driving condition; and adjust future driving characteristics for the autonomous vehicle based on the analyzed driving characteristics for the autonomous vehicle and the analyzed detected data relating to the environment and the at least one object.

5. The autonomous vehicle of claim 1, wherein the at least one processor of the at least one autonomy computing system calculate the DSC ratio for the autonomous vehicle by:

defining the anticipated spatial occupancy for the autonomous vehicle within the environment;

computing the drivable space within the environment based on the data generated by the one or more sensors of the autonomous vehicle; and calculating the DSC ratio based on the defined, anticipated spatial occupancy for the autonomous vehicle within the environment and the computed drivable space within the environment.

6. The autonomous vehicle of claim 5, wherein the at least one processor of the at least one autonomy computing system compute the drivable space within the environment by:

outlining a measurable area of the environment based on the driving characteristics of the autonomous vehicle and operational parameters of the one or more sensors disposed on the autonomous vehicle, the measurable area of the environment including:

a road including at least one driving lane and a shoulder position adjacent the at least one driving lane, and a road verge positioned adjacent the shoulder of the road;

detecting, via the one or more sensors, the at least one object disposed within the measurable area of the environment;

determining an object spatial occupancy for the at least one object disposed within the measurable area of the environment, the object spatial occupancy for the at least one object based on object data for the at least one object detected by the one or more sensors; and defining the drivable space within the environment as the outlined, measurable area of the environment excluding the determined object spatial occupancy for the at least one object disposed within the measurable area of the environment.

7. One or more non-transitory computer-readable storage mediums for controlling an autonomous vehicle traveling within an environment, comprising a plurality of instructions stored thereon that, in response to being executed, cause a system to:

calculate a drivable space consumption (DSC) ratio for the autonomous vehicle traveling within the environment based on an anticipated spatial occupancy for the autonomous vehicle within the environment and a drivable space within the environment, wherein the plurality of instructions further cause the system to compute the drivable space within the environment by:

outlining a measurable area of the environment based on driving characteristics of the autonomous vehicle and operational parameters of one or more sensors disposed on the autonomous vehicle, the measurable area of the environment including:

a road including at least one driving lane and a shoulder positioned adjacent to the at least one driving lane, and a road verge positioned adjacent to the shoulder of the road;

detecting, via the one or more sensors, at least one object disposed within the measurable area of the environment;

determining an object spatial occupancy for the at least one object disposed within the measurable area of the environment, based on object data for the at least one object detected by the one or more sensors; and defining the drivable space within the environment as the outlined, measurable area of the environment excluding the determined object spatial occupancy for the at least one object disposed within the measurable area of the environment;

determine a risk level for the autonomous vehicle based on the calculated DSC ratio; and adjust the driving characteristics for the autonomous vehicle traveling in the environment in response to the determined risk level for the autonomous vehicle including a high-risk driving condition.

8. The one or more non-transitory computer-readable storage mediums of claim 7, wherein the plurality of instructions stored thereon cause the system further to:

determine the autonomous vehicle is in the high-risk driving condition in response to the calculated DSC ratio being equal to or greater than a threshold; and determine the autonomous vehicle is in a low-risk driving condition in response to the calculated DSC ratio being less than the threshold.

9. The one or more non-transitory computer-readable storage mediums of claim 8, wherein the plurality of instructions stored thereon cause the system further to:

maintain the driving characteristics of the autonomous vehicle traveling in the environment in response to the determined risk level for the autonomous vehicle includes the low-risk driving condition.

10. The one or more non-transitory computer-readable storage mediums of claim 7, wherein the plurality of instructions stored thereon cause the system further to:

analyze the driving characteristics for the autonomous vehicle in response to the determined risk level for the autonomous vehicle including the high-risk driving condition;

analyze detected data relating to the environment surrounding the autonomous vehicle and at least one object included within the environment in response to the determined risk level for the autonomous vehicle including the high-risk driving condition; and adjust future driving characteristics for the autonomous vehicle based on the analyzed driving characteristics for the autonomous vehicle and the analyzed detected data relating to the environment and the at least one object.

11. The one or more non-transitory computer-readable storage mediums of claim 10, wherein the plurality of instructions stored thereon cause the system to calculate the DSC ratio for the autonomous vehicle by:

defining the anticipated spatial occupancy for the autonomous vehicle within the environment;

computing the drivable space within the environment based on the data detected by one or more sensors of the autonomous vehicle; and calculating the DSC ratio based on the defined, anticipated spatial occupancy for the autonomous vehicle within the environment and the computed drivable space within the environment.

12. The one or more non-transitory computer-readable storage mediums of claim 7, wherein the plurality of instructions stored thereon cause the system to determine the risk level for the autonomous vehicle by:

prior to adjusting the driving characteristics of the autonomous vehicle, determining a duration of time in which the determined risk level for the autonomous vehicle includes the high-risk driving condition;

comparing the determined duration of time to a high-risk time threshold;

maintaining the driving characteristics of the autonomous vehicle traveling in the environment in response to the determined duration of time being less than the high-risk time threshold; and adjusting the driving characteristics of the autonomous vehicle in response to the determined duration of time being equal to or greater than the high-risk time threshold.

13. A computer-implemented method for controlling an autonomous vehicle traveling within an environment, the method comprising:

calculating a drivable space consumption (DSC) ratio for the autonomous vehicle traveling within the environment based on an anticipated spatial occupancy for the autonomous vehicle within the environment and a drivable space within the environment;

determining a risk level for the autonomous vehicle based on the calculated DSC ratio; and adjusting driving characteristics for the autonomous vehicle traveling in the environment in response to the determined risk level for the autonomous vehicle including a high-risk driving condition, wherein determining the risk level further comprises:

prior to adjusting the driving characteristics of the autonomous vehicle, determining a duration of time in which the determined risk level for the autonomous vehicle includes the high-risk driving condition;

comparing the determined duration of time to a high-risk time threshold;

maintaining the driving characteristics of the autonomous vehicle traveling in the environment in response to the determined duration of time being less than the high-risk time threshold; and adjusting the driving characteristics of the autonomous vehicle in response to the determined duration of time being equal to or greater than the high-risk time threshold.

14. The computer-implemented method of claim 13, further comprising:

determining the autonomous vehicle is in the high-risk driving condition in response to the calculated DSC ratio being equal to or greater than a threshold; and determining the autonomous vehicle is in a low-risk driving condition in response to the calculated DSC ratio being less than the threshold.

15. The computer-implemented method of claim 14, further comprising:

maintaining the driving characteristics of the autonomous vehicle traveling in the environment in response to the determined risk level for the autonomous vehicle includes the low-risk driving condition.

16. The computer-implemented method of claim 13, further comprising:

analyzing the driving characteristics for the autonomous vehicle in response to the determined risk level for the autonomous vehicle including the high-risk driving condition;

analyzing detected data relating to the environment surrounding the autonomous vehicle and at least one object included within the environment in response to the determined risk level for the autonomous vehicle including the high-risk driving condition; and adjusting future driving characteristics for the autonomous vehicle based on the analyzed driving characteristics for the autonomous vehicle and the analyzed detected data relating to the environment and the at least one object.

17. The computer-implemented method of claim 13, wherein the calculating of the DSC ratio for the autonomous vehicle further includes:

defining the anticipated spatial occupancy for the autonomous vehicle within the environment;

computing the drivable space within the environment based on data detected by one or more sensors of the autonomous vehicle; and calculating the DSC ratio based on the defined, anticipated spatial occupancy for the autonomous vehicle within the environment and the computed drivable space within the environment.

* * * * *